United States Patent
Okamoto

(10) Patent No.: US 6,491,022 B2
(45) Date of Patent: Dec. 10, 2002

(54) FAIL-SAFE PROCESSING SYSTEM AND METHOD FOR INTERNAL COMBUSTION ENGINE

(75) Inventor: Naoki Okamoto, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/977,256

(22) Filed: Oct. 16, 2001

(65) Prior Publication Data

US 2002/0066435 A1 Jun. 6, 2002

(30) Foreign Application Priority Data

Oct. 16, 2000 (JP) .................................... 2000-315534
Sep. 1, 2001 (JP) .................................... 2001-274154

(51) Int. Cl.$^7$ .............................................. F02D 7/00
(52) U.S. Cl. ...................... 123/396; 123/399; 123/90.15
(58) Field of Search ................................ 123/396, 399, 123/90.15, 198 D, 321, 322

(56) References Cited

U.S. PATENT DOCUMENTS 5,738,053 A * 4/1998 Kato .................... 123/90.15
6,178,947 B1    1/2001 Machida et al. ............ 123/396
6,209,518 B1    4/2001 Machida et al. ............ 123/396
6,276,331 B1    8/2001 Machida et al. ............ 123/396
6,311,667 B1 * 11/2001 Satou et al. ................. 123/295

FOREIGN PATENT DOCUMENTS

JP         2000-73799        3/2000

* cited by examiner

Primary Examiner—Bibhu Mohanty
(74) Attorney, Agent, or Firm—Foley & Lardner

(57) ABSTRACT

A fail-safe processing method for an internal combustion engine including: carrying out a failure diagnosis for determining whether a failure of an electronic-controlled intake device occurs; determining whether a mode of the failure of the electronic-controlled intake device is a vehicle accelerating mode when it is determined that the failure occurs; carrying out a fail-safe processing when it is determined that the failure mode is the vehicle accelerating mode, wherein the fail-safe processing determines an optimal value of the valve-lift amount; and controlling a variable valve-lift mechanism in accordance with the optimal value of the valve-lift amount.

18 Claims, 6 Drawing Sheets

FAIL-SAFE PROCESSING SYSTEM AND METHOD FOR INTERNAL COMBUSTION ENGINE

BACKGROUND OF THE INVENTION

The present invention relates to a fail-safe processing system and method for internal combustion engines with an electronic-controlled intake device and a variable valve-lift mechanism for controlling a lift amount of valves.

An exemplary fail-safe processing system for internal combustion engines is constructed to stop an engine in the event that the electronic-controlled intake device fails or fixes with an air amount sufficiently secured for vehicle acceleration. Specifically, when detecting a failure of the electronic-controlled intake device which can make fine restriction of engine output torque impossible to cause vehicle acceleration or the like contrary to drivers intention, the system stops engine operation by fuel cut, etc.

In the above fail-safe processing system, however, since the system carries out fuel cut and then stops engine operation when it is determined that a failure of the electronic-controlled intake device occurs with the vehicle being ready for acceleration, the following problem arises. In the event of failure of the electronic-controlled intake device at the time of vehicle acceleration during expressway cruising or passing, the vehicle causes abrupt deceleration, which can bring a driver and passengers into insecure conditions. Moreover, due to inability to run by itself, the vehicle cannot evacuate to safety.

SUMMARY OF THE INVENTION

It is, therefore, an object of the present invention to provide a fail-safe processing system and method for internal combustion engines, which when a failure of an electronic-controlled intake device or a variable valve-lift mechanism occurs with a vehicle being ready for acceleration, allows driver's recognition of this occurrence, avoiding of vehicle acceleration or deceleration contrary to his intention, and continuous vehicle running for evacuation to safety.

The present invention provides generally a fail-safe processing method for an internal combustion engine, the engine including at least an electronic-controlled intake device and a variable valve-lift mechanism for controlling a valve-lift amount, the method comprising:

carrying out a failure diagnosis for determining whether a failure of the electronic-controlled intake device occurs;

determining whether a mode of the failure of the electronic-controlled intake device is a vehicle accelerating mode when it is determined that the failure occurs;

carrying out a fail-safe processing when it is determined that the failure mode is the vehicle accelerating mode, wherein the fail-safe processing determines an optimal value of the valve-lift amount; and controlling the variable valve-lift mechanism in accordance with the optimal value of the valve-lift amount.

BRIEF DESCRIPTION OF THE DRAWINGS

The other objects and features of the present invention will be apparent from the following description with reference to the attached drawings, wherein.

DETAILED DESCRIPTION OF THE INVENTION

Figure 1:
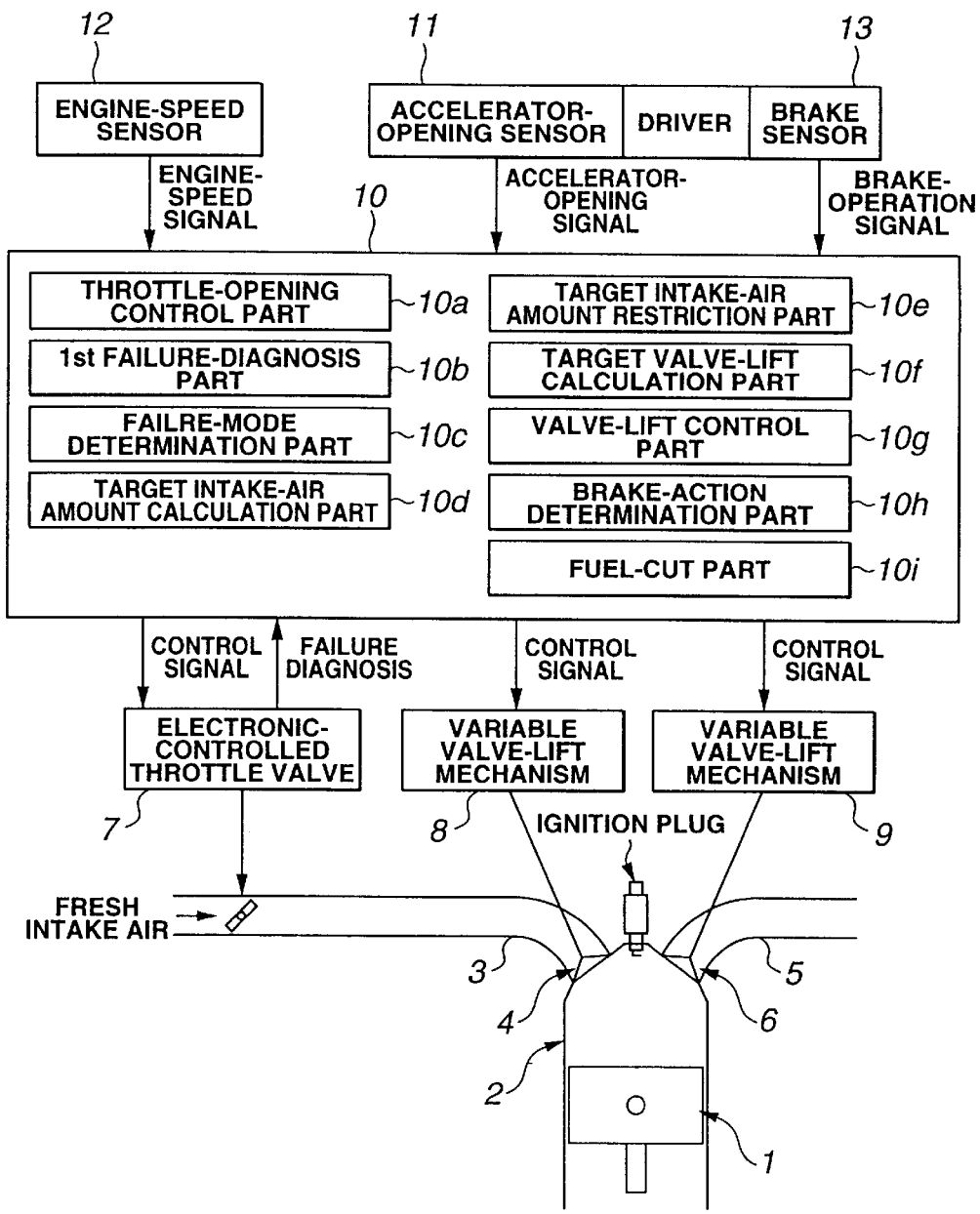
FIG. 1 is a block diagram showing a first embodiment of a fail-safe processing system for internal combustion engines according to the present invention.

Referring to the drawings wherein like reference numerals designate like parts throughout the views, a description will be made with regard to a fail-safe processing system and method for internal combustion engines embodying the present invention.

Figure 2:
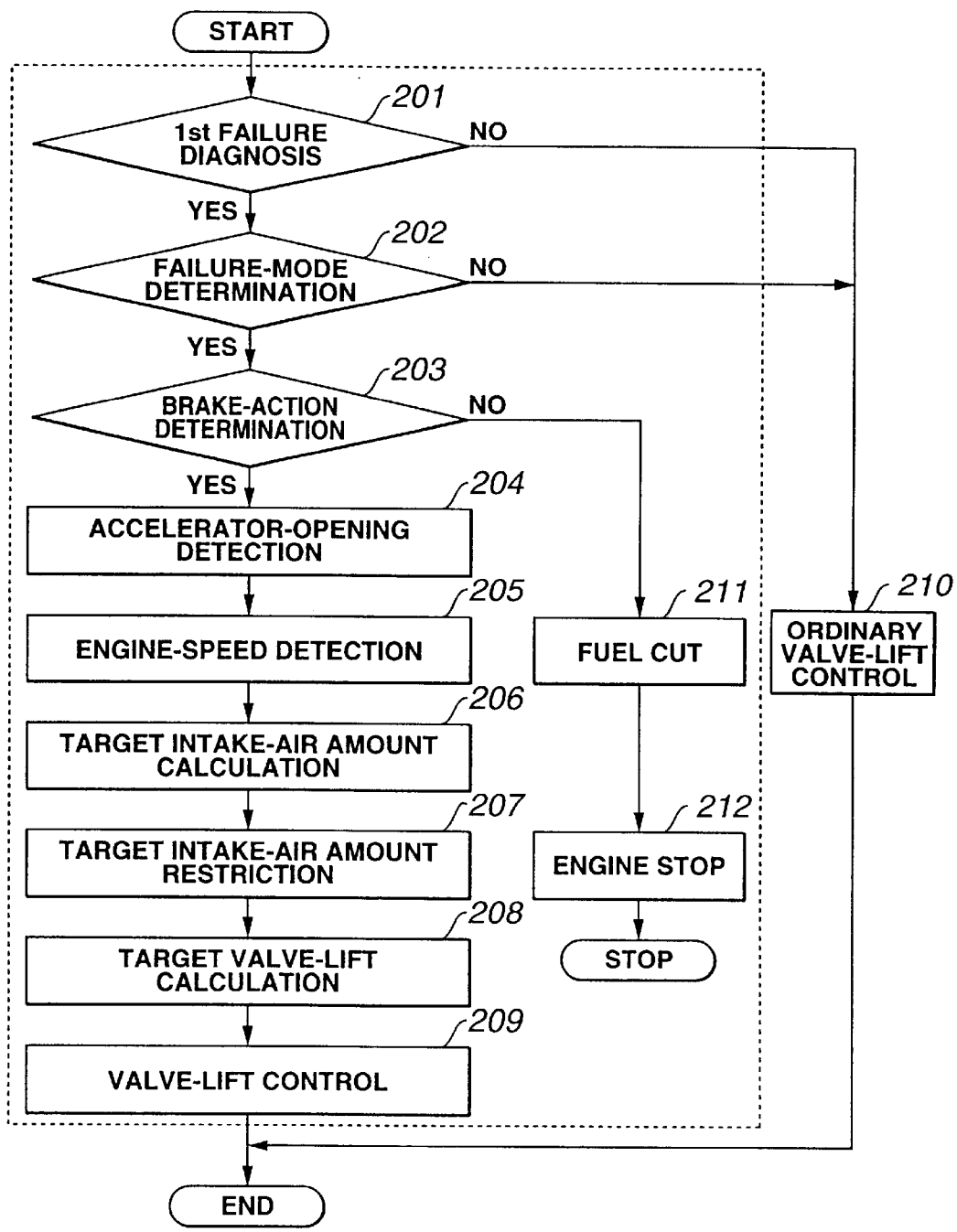
FIG. 2 is a flowchart showing the operation of the first embodiment.

FIGS. 1–2 show a first embodiment of the present invention. Referring to FIG. 1, the fail-safe processing system comprises a piston 1, a cylinder 2, an intake pipe 3, an exhaust pipe 5, an exhaust valve 6, an electronic-controlled throttle valve or electronic-controlled intake device 7, an intake-side variable valve-lift mechanism 8, an exhaust-side variable valve-lift mechanism 9, an electronic control unit (ECU) 10, an accelerator-opening sensor 11, an engine-speed sensor 12, and a brake sensor 13.

ECU 10 comprises a throttle-valve opening control part or means 10a, a first failure-diagnosis part or means 10b, a failure-mode determination part or means 10c, a target intake-air amount calculation part or means 10d, a target intake-air amount restriction part or means 10e, a target valve-lift calculation part or means 10f, a valve-lift control part or means 10g, a brake-action determination part or means 10h, and a fuel-cut part or means 10i. Target intake-air amount calculation part 10d, target intake-air amount restriction part 10e, target valve-lift calculation part 10f, and valve-lift control part 10g serve to carry out fail-safe processing as defined, e.g. in claim 1. Fuel-cut part 10i serves to carry out fail-safe processing as defined, e.g. in claim 3.

Accelerator-opening sensor 11 senses an accelerator opening and an accelerator-opening variation, engine-speed sensor 12 senses an engine speed, and brake sensor 13 senses a brake action.

Electronic-controlled throttle valve 7 is subjected to opening control by throttle-valve opening control part 10a of ECU 10 and in accordance with an accelerator-opening signal or the like sensed by accelerator-opening sensor 11 so as to control an intake-air amount.

Intake-side variable valve-lift mechanism 8 inherently carries out variable control of a lift amount of intake valve 4 to enhance the combustion and output performance of the engine. During control at fail-safe time as will be described later, mechanism 8 also carries out control of an intake-air amount to be supplied to cylinder 2.

Likewise, exhaust-side variable valve-lift mechanism 9 inherently carries out variable control of a lift amount of exhaust valve 6 to enhance the combustion and output performance of the engine. During control at fail-safe time as will be described later, mechanism 9 also carries out control of an exhaust-air amount to be discharged from cylinder 2.

Referring to FIG. 2, the operation of the first embodiment will be described. At a step 201, a first failure diagnosis is carried out by first failure-diagnosis part 10b, i.e. it is determined whether or not a failure of electronic-controlled throttle valve 7 occurs, i.e. throttle valve 7 fails to operate in accordance with a command of throttle-valve opening control part 10a. If it is determined that no failure of electronic-controlled throttle valve 7 occurs, control proceeds to a step 210 where ordinary valve-lift control is carried out, and then control comes to an end.

On the other hand, at step 201, if it is determined that a failure of electronic-controlled throttle valve 7 occurs, control proceeds to a step 202 where failure-mode determination is carried out by failure-mode determination part 10c, i.e. it is determined whether or not a mode of failure of electronic-controlled throttle valve 7 is vehicle accelerating mode. If it is determined that the failure mode is not vehicle accelerating mode, control proceeds to a step 210 where ordinary valve-lift control is carried out, and then control comes to an end.

On the other hand, at step 202, if it is determined that the failure mode is vehicle accelerating mode, control proceeds to a step 203 where brake-action determination is carried out by brake-action determination part 10h, i.e. it is determined whether or not vehicle deceleration can be made by brake operation. Specifically, it is determined whether or not the negative pressure can be produced as brake-force source. If it is determined that vehicle deceleration can be made by brake operation, control proceeds to steps 204–209 wherein fail-safe processing is carried out.

Specifically, at step 204, an accelerator opening and accelerator-opening variation detected by accelerator-opening sensor 11 are read in memory, whereas at step 205, an engine speed detected by engine-speed sensor 12 is read in memory.

At subsequent step 206, a target intake-air amount is calculated by target intake-air amount calculation part 10d in accordance with the detected engine speed and the detected accelerator opening and accelerator-opening variation and in response to driver's requirements for vehicle acceleration or deceleration.

At subsequent step 207, the calculated target intake-air amount is restricted by target intake-air amount restriction part 10e to have less engine output than a target value thereof.

At subsequent step 208, a target valve-lift amount is calculated by target valve-lift calculation part 10f in accordance with the restricted target intake-air amount and the engine speed.

Finally, at step 209, intake-side variable valve-lift mechanism 8 and exhaust-side variable valve-lift mechanism 9 are controlled by valve-lift control part 10g to achieve the calculated target valve-lift amount Then, control comes to an end, and returns to the start.

On the other hand, at step 203, if it is determined that vehicle deceleration cannot be made by brake operation, control proceeds to a step 211 where fuel cut is carried out, and then control proceeds to a step 212 where the engine is stopped. Fuel cut may be carried out after a predetermined period of time of fuel supply.

Next, the effect of the first embodiment will be described. In the first embodiment, when first failure-diagnosis part 10b reveals that a failure of electronic-controlled throttle valve 7 occurs, and failure-mode determination part 10c reveals that the failure mode is vehicle accelerating mode, lift amounts of intake valve 4 and exhaust valve 6 for variable valve-lift mechanisms 8, 9 are controlled through fail-safe processing (steps 204–209) to reduce an intake-air amount to be supplied to cylinder 2. With this, a reduction in engine output torque can be achieved.

This allows driver's recognition of occurrence of a failure of electronic-controlled throttle valve 7, avoiding of vehicle acceleration or deceleration contrary to his intention, and continuous vehicle running for evacuation to safety.

Moreover, the lift amounts of intake and exhaust valves 4, 6 are controlled through fail-safe processing to gradually reduce an intake-air amount to be supplied to cylinder 2 and an exhaust-air amount to be discharged therefrom, enabling driver's recognition of occurrence of a failure of electronic-controlled throttle valve 7 in avoiding insecure conditions due to abrupt reduction in engine output torque.

As described above, in the event of failure of electronic-controlled throttle valve 7, the lift amounts of intake and exhaust valves 4, 6 for variable valve-lift mechanisms 8, 9 are controlled or restricted, enabling a reduction in engine output torque. However, in typical engines, a negative-pressure source of a brake originates from negative pressure produced by throttle valve 7, so that in the event of failure with throttle valve 7 in full open, the negative pressure cannot be produced, leading to possible reduction in brake force. On the other hand, in the first embodiment, if a failure of electronic-controlled throttle valve 7 occurs with the vehicle being ready for acceleration, and a brake force reduces, fuel cut is carried out to stop the vehicle. This allows emergency stop of the vehicle even with reduced brake force, avoiding insecure conditions. It is noted that even when a negative-pressure source of the brake is produced by a negative-pressure pump, the above control can deal with all situations of the vehicle with reduced brake force.

FIGS. 34 show a second embodiment of the present invention which is substantially the same as the first embodiment except that fail-safe processing is carried out in the event of failure of variable valve-lift mechanism 8, 9.

Figure 3:
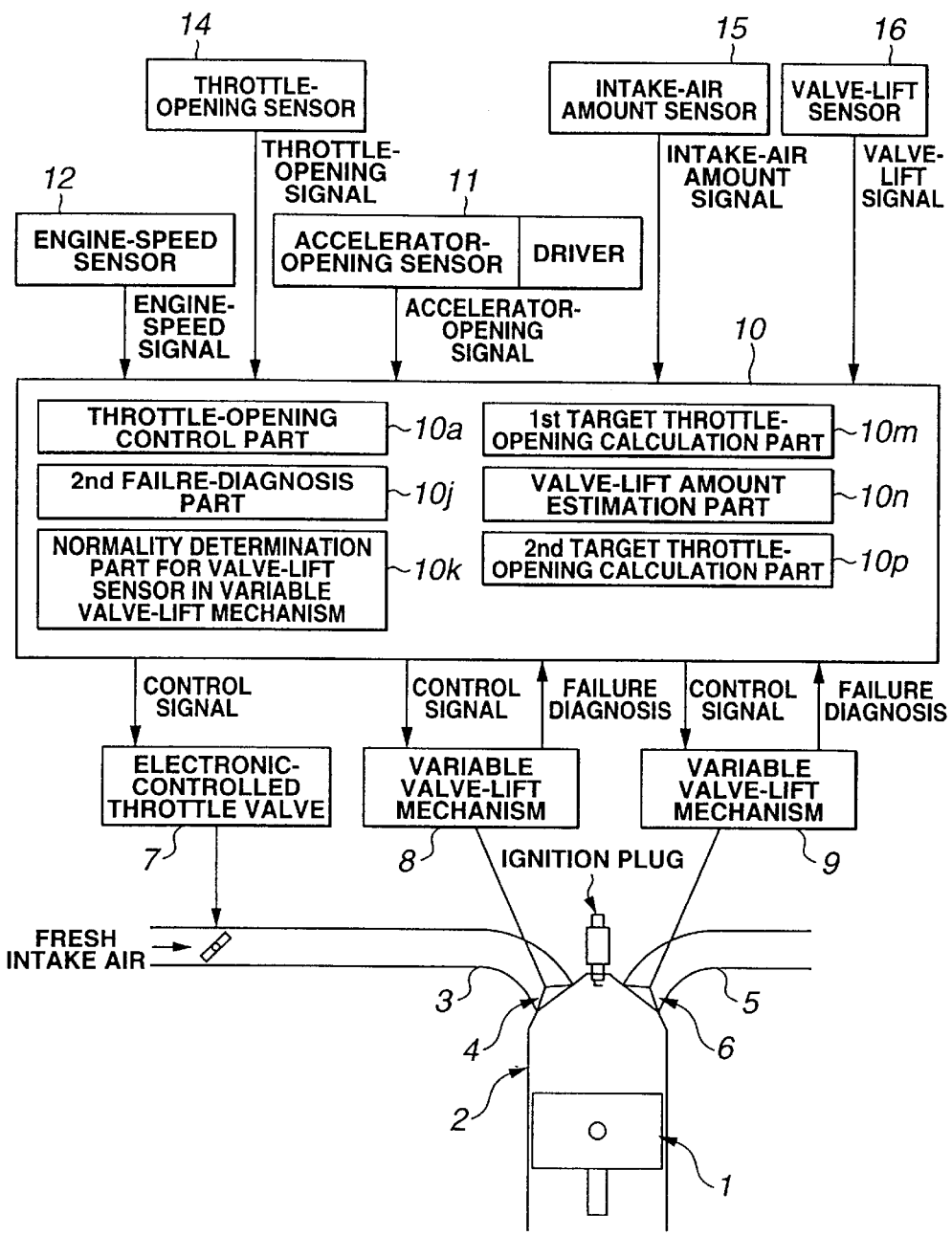
FIG. 3 is a view similar to FIG. 1, showing a second embodiment of the present invention.

Referring to FIG. 3, the fail-safe processing system comprises a throttle-opening sensor 14, an intake-air amount sensor 15, and a valve-lift sensor 16. Throttle-opening sensor 14 senses a throttle opening, intake-air amount sensor 15 senses an intake-air amount, and valve-lift sensor 16 senses a valve-lift amount.

ECU 10 comprises a throttle-opening control part or means 10a, a second failure-diagnosis part or means 10j, a normality determination part or means 10k for valve-lift sensor 16 in variable valve-lift mechanism, a first target throttle-opening calculation part or means 10m, a valve-lift amount estimation part or means 10n, and a second target throttle-opening calculation part or means 10p. Throtte-opening control part 10a and first target throttle-opening calculation part 10m serve to carry out fail-safe processing as defined, e.g. in claim 5. Throttle-opening control part 10a, valve-lift amount estimation part 10n, and second target throttle-opening calculation part 10p serve to carry out fail-safe processing as defined, e.g. in claim 7.

Figure 4:
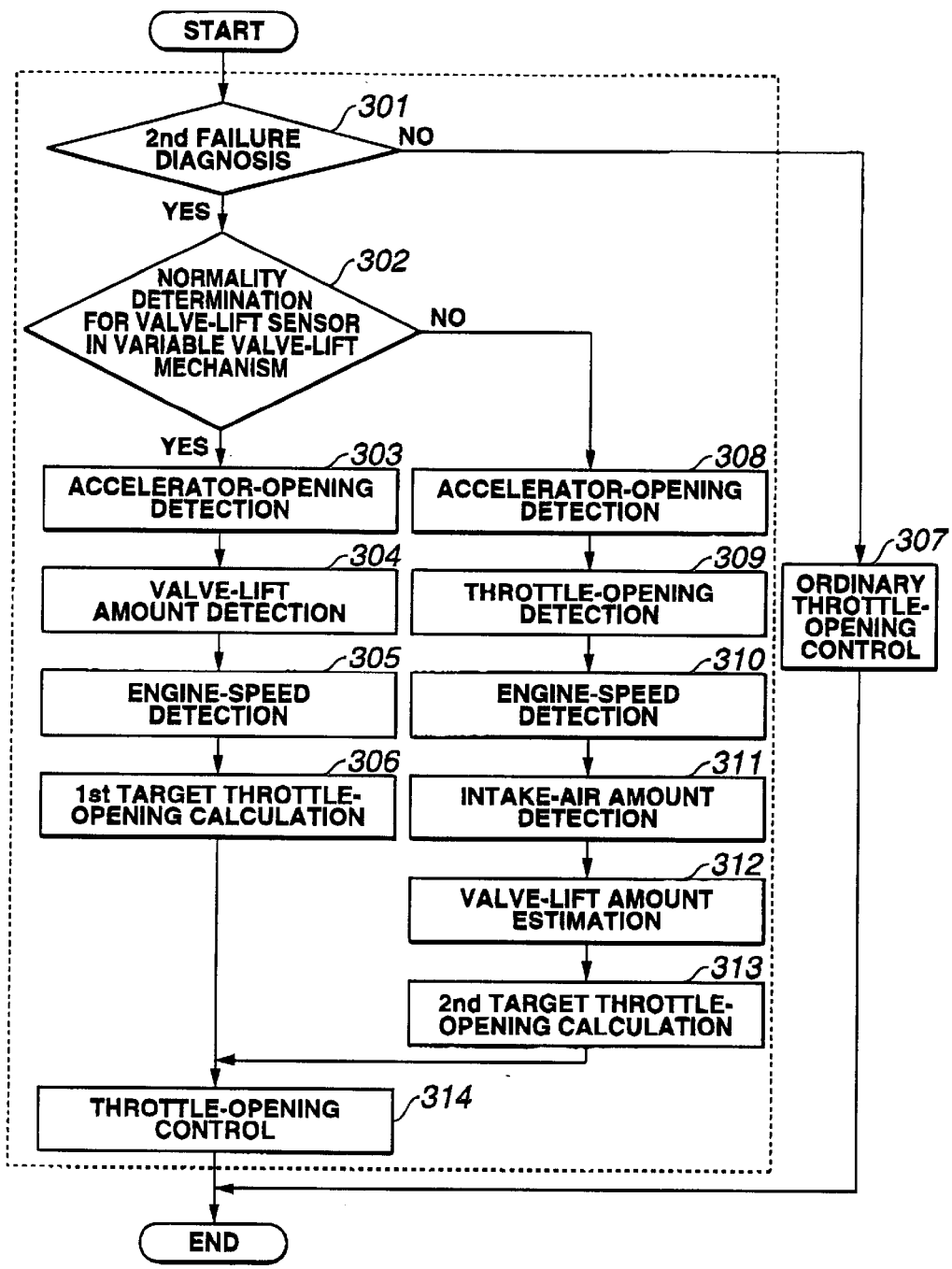
FIG. 4 is a view similar to FIG. 2, showing the operation of the second embodiment.

Referring to FIG. 4, the operation of the second embodiment will be described. At a step 301, a second failure diagnosis is carried out by second failure-diagnosis part 10j, i.e. it is determined whether or not variable valve-lift mechanism 8, 9 is in failure or out of working order. If it is determined that that variable valve-lift mechanism 8, 9 is not in failure, control proceeds to a step 307 where ordinary throttle-opening control is carried out, and then control comes to an end.

On the other hand, at step 301, if it is determined that variable valve-lift mechanism 8, 9 is in failure, control proceeds to a step 302 where normality determination for valve-lift sensor 16 in variable valve-lift mechanism is carried out by normality determination part 10k, i.e. it is determined whether or not valve-lift sensor 16 is in working order. If it is determined that valve-lift sensor 16 is in working order, control proceeds to steps 303–314 where fail-safe processing is carried out.

Specifically, at step 303, an accelerator opening and accelerator-opening variation detected by accelerator-opening sensor 11 are read in memory. At step 304, a valve-lift amount detected by valve-lift sensor 16 is read in memory. And at step 305, an engine speed detected by engine-speed sensor 12 is read in memory.

At subsequent step 306, a first target throttle opening is calculated by first target throttle-opening calculation part 10m in accordance with the detected accelerator opening, etc. The calculated first target throttle opening is corrected by the detected valve-lift amount, engine speed, etc. to obtain a final value of first target throttle opening at the time of failure. The final value of first target throttle opening is determined to allow a gradual reduction in intake-air amount while maintaining the vehicle in the runnable state.

Finally, at step 314, opening control is carried out by throtte-opening control part 10a such that electronic-controlled throttle valve 7 has final value of first target throttle opening. Then, control comes to an end.

On the other hand, at step 302, if it is determined that valve-lift sensor 16 is not in working order, control proceeds to steps 308–314 where fail-safe processing is carried out. Specifically, at step 308, an accelerator opening and accelerator-opening variation detected by accelerator-opening sensor 11 are read in memory. At step 309, a throttle opening detected by throttle-opening sensor 14 is read in memory. At step 310, an engine speed detected by engine-speed sensor 12 is read in memory. At step 311, an intake-air amount detected by intake-air amount sensor 15 is read in memory.

Subsequently, at step 312, a current valve-lift amount is estimated by first target throttle-opening calculation part 10n in accordance with the detected throttle opening, engine speed, and intake-air amount. At step 313, in a similar manner to at step 306, a second target throttle opening is calculated by second target throttle-opening calculation part 10p in accordance with the detected accelerator opening, etc. and the estimated valve-lift amount. The calculated second target throttle opening is corrected by the estimated valve-lift amount, the detected engine speed, etc. to obtain a final value of second target throttle opening at the time of failure. The final value of second target throttle opening is determined to allow a gradual reduction in intake-air amount while maintaining the vehicle in the runnable state. In the event of failure with minimum valve-lift amount, the intake-air amount can be increased to maintain the vehicle in the runnable state.

Finally, at step 314, opening control is carried out by throttle-opening control part 10a such that electronic-controlled throttle valve 7 has final value of second target throttle opening. Then, control comes to an end.

Next, the effect of the second embodiment will be described. In the second embodiment, when second failure-diagnosis part 10j reveals that variable valve-lift mechanism 8, 9 is in failure, and normality determination part 10k reveals that valve-lift sensor 16 is in working order, the opening of electronic-controlled throttle valve 7 is controlled through fail-safe processing (steps 303–306 and 314) to correspond to a target throttle opening obtained from the accelerator opening, valve-lift amount, and engine speed. This leads to achievement of optimal engine output torque at the time of failure without stopping the engine.

This allows drivers recognition of occurrence of a failure of variable valve-lift mechanism 8, 9, and prevention of vehicle behavior contrary to his intention. Moreover, due to no engine stop, this enables continuous vehicle running for evacuation to safety.

Moreover, when second failure-diagnosis part 10j reveals that variable valve-lift mechanism 8, 9 is in failure, and normality determination part 10k reveals that valve-lift sensor 16 is not in working order, the opening of electronic-controlled throttle valve 7 is controlled through fail-safe processing (steps 308–314) to correspond to a target throttle opening obtained from the accelerator opening, valve-lift amount, and engine speed. This leads to achievement of optimal engine output torque at the time of failure without stopping the engine.

Thus, in the event of failure of valve-lift sensor 16, also, this allows driver's recognition of occurrence of a failure of variable valve-lift mechanism 8, 9, and prevention of vehicle behavior contrary to his intention. Moreover, due to no engine stop, this enables continuous vehicle running for evacuation to safety.

Moreover, in opening control of electronic-controlled throttle valve 7 carried out by throtte-opening control part 10a, a target throttle opening at the time of failure is determined to allow a gradual reduction in intake-air amount while maintaining the vehicle in the runnable state. This allows drivers recognition of occurrence of a failure of variable valve-lift mechanism 8, 9 (and valve-lift sensor 16) in avoiding insecure conditions due to abrupt reduction in engine output torque.

Figure 5:
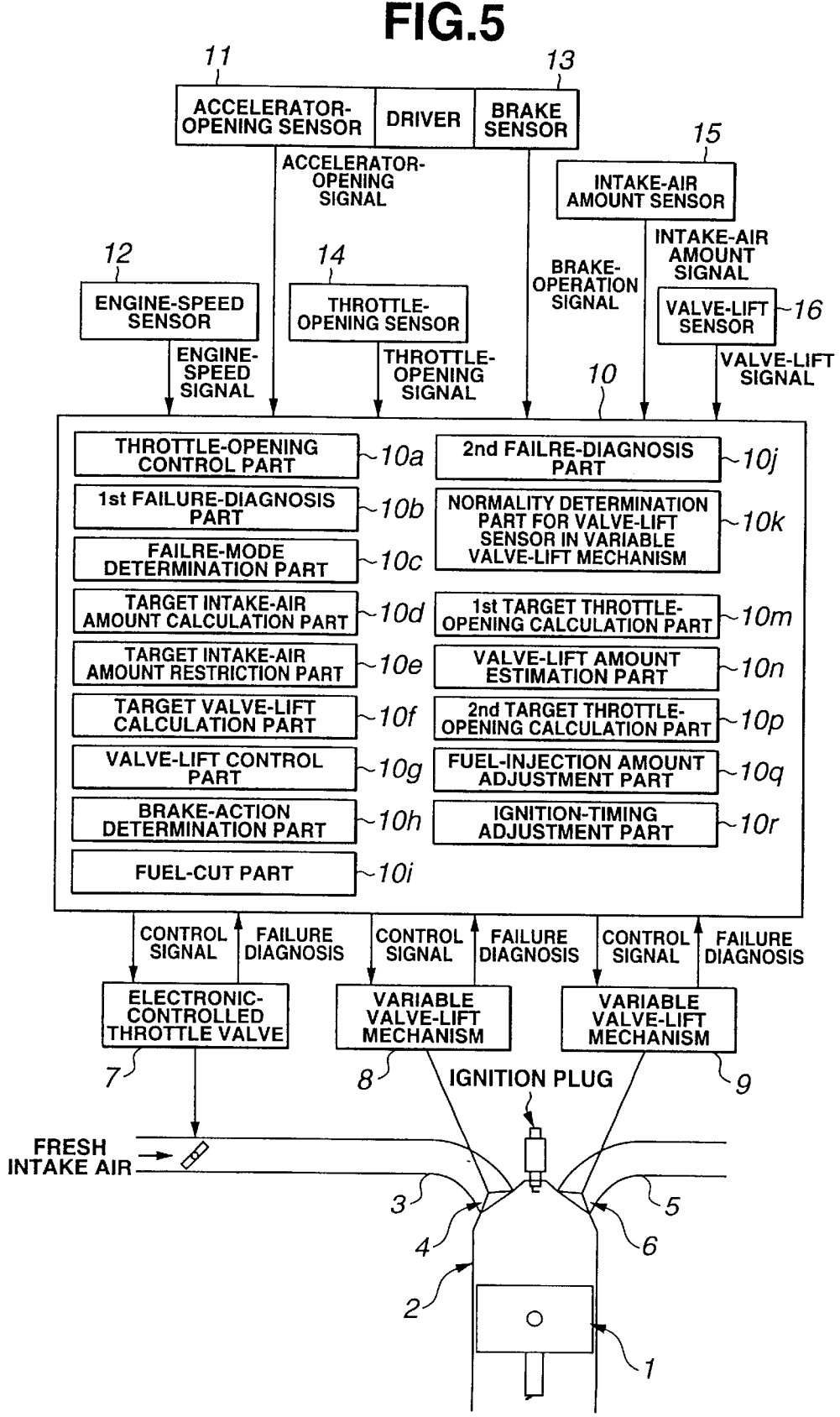
FIG. 5 is a view similar to FIG. 3, showing a third embodiment of the present invention.
Figure 6:
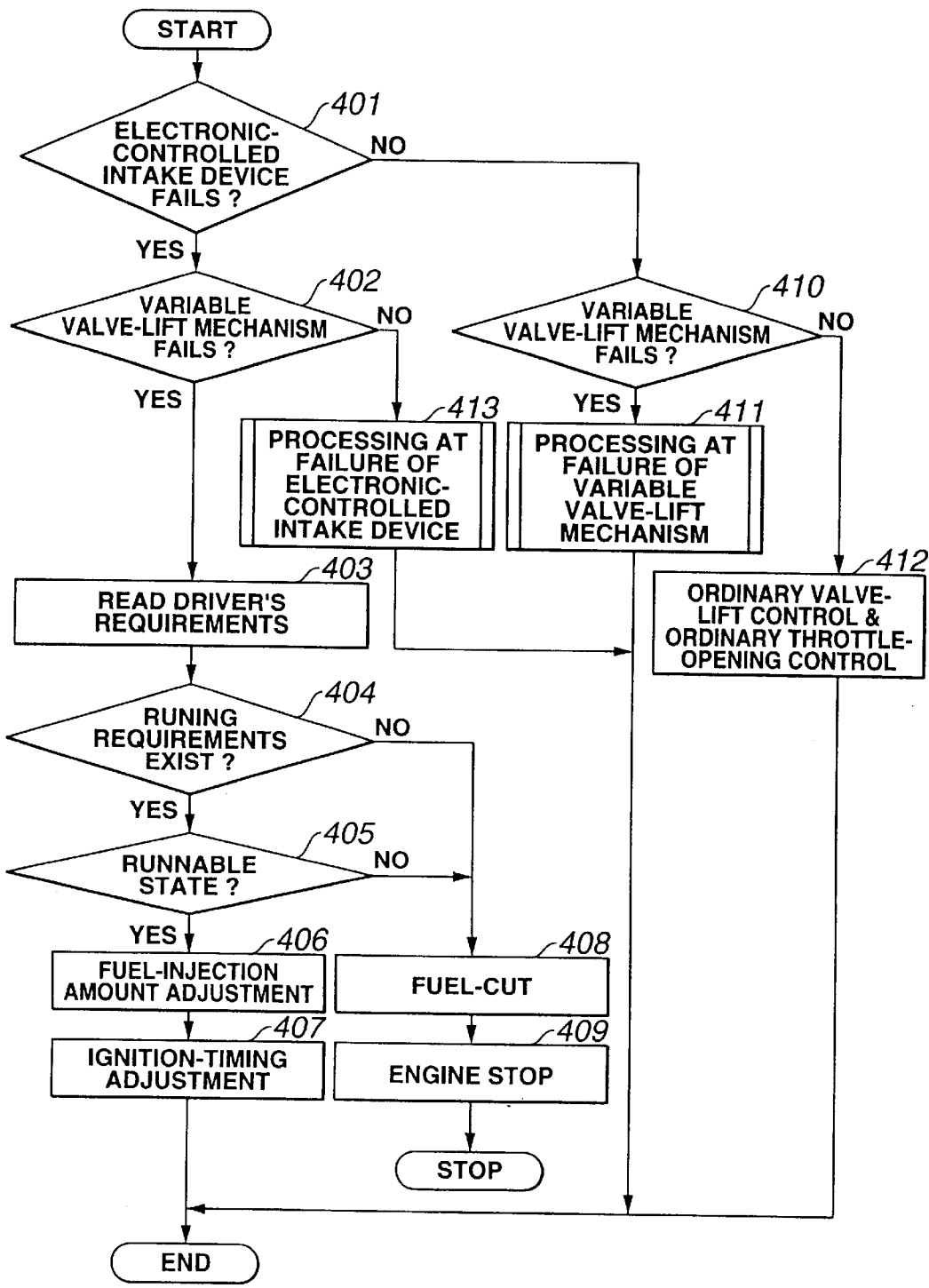
FIG. 6 is a view similar to FIG. 4, showing the operation of the third embodiment.

FIGS. 5–6 show a third embodiment of the present invention which is substantially the same as the above embodiments except that fail-safe processing is carried out in the event of failure of one of electronic-controlled throttle valve 7 and variable valve-lift mechanism 8, 9.

Referring to FIG. 5, in the third embodiment, the fail-safe processing system comprises, in addition to all structural elements in the first and second embodiments, a fuel-injection-amount adjustment part or means 10q and an ignition-timing adjustment part or means 10r. Fuel-injection-amount adjustment part 10q serves to carry out fail-safe processing as defined, e.g. in claim 9.

Referring to FIG. 6, the operation of the third embodiment will be described. At a step 401, it is determined in first failure-diagnosis part 10b whether or not a failure of electronic-controlled throttle valve 7 occurs, i.e. throttle valve 7 fails to operate in accordance with a command of throttle-valve opening control part 10a. If it is determined that a failure of electronic-controlled throttle valve 7 occurs, control proceeds to a step 402.

At step 402, it is determined in second failure-diagnosis part 10j whether or not variable valve-lift mechanism 8, 9 is in failure or out of working order. If it is determined that that variable valve-lift mechanism 8, 9 is in failure, control proceeds to a step 403 where driver's requirements in the form of an accelerator-opening signal derived from accelerator-opening sensor 11, a brake-operation signal derived from brake sensor 13, etc. are read in memory, then control proceeds to a step 404.

At step 404, it is determined based on the accelerator-opening signal, the brake-operation signal, etc. whether or not driver's running requirements exist. If it is determined that running requirements exist, control proceeds to a step 405 where it is determined whether or not the vehicle is in the runnable state. If it is determined that the vehicle is in the runnable state, control proceeds to a step 406 where a fuel-injection amount is adjusted by fuel-injection-amount adjustment part 10$q$.

At a subsequent step 407, an ignition timing is adjusted by ignition-timing adjustment part 10$r$, and then control comes to an end. It is noted that adjustment of the fuel-injection amount and that of the ignition timing are so carried out as to decrease engine output when the intake-air amount is greater, and increase engine output when the amount is smaller.

If it is determined at step 404 that running requirements do not exist, or it is determined at step 405 that the vehicle is not in the runnable state, control proceeds to a step 408 where fuel cut is carried out by fuel-cut part 10$i$, and then control proceeds to a step 409 where the engine is stopped. Fuel-cut part 10$i$ serves to carry out second and third fail-safe processings as defined, e.g. in claims 8 and 9.

At step 401, if it is determined that a failure of electronic-controlled throttle valve 7 does not occur, control proceeds to a step 410 where it is determined in second failure-diagnosis part 10$j$ whether or not variable valve-lift mechanism 8, 9 is in failure or out of working order. If it is determined that that variable valve-lift mechanism 8, 9 is in failure, control proceeds to a step 411 where processing at the time of failure of variable valve-lift mechanism 8, 9, i.e. control at steps 302–314 in FIG. 4, is carried out, and then control comes to an end.

At step 410, if it is determined that that variable valve-lift mechanism 8, 9 is not in failure, control proceeds to a step 412 where ordinary valve-lift control and ordinary throttle-opening control are carried out, and then control comes to an end.

At step 402, if it is determined that variable valve-lift mechanism 8, 9 is not in failure, control proceeds to a step 413 where control at steps 202–212 in FIG. 2 is carried out, and then control comes to an end.

As described above, the third embodiment provides, in addition to the same effect as in the first and second embodiments, a further effect that even in the event of failure of one of electronic-controlled throttle valve 7 and variable valve-lift mechanism 8, 9, another normal one allows continuous vehicle running for evacuation to safety.

Moreover, in the event of failure of both of electronic-controlled throttle valve 7 and variable valve-lift mechanism 8, 9, and when running requirements exist, and the vehicle is in the runnable state, a fuel-injection amount and an ignition timing are adjusted to decrease or increase engine output. This allows avoiding of vehicle acceleration or deceleration contrary to driver's intention and continuous vehicle running for evacuaton to safety.

On the other hand, when running requirements do not exist, and the vehicle is not in the runnable state, fuel cut is carried out, which is followed by engine stop processing. This allows avoiding of vehicle acceleration contrary to driver's intention.

Having described the present invention with regard to the preferred embodiments, it is to be understood that the present invention is not limited thereto, and various changes and modifications can be made without departing from the scope of the present invention.

By way of example, in the first and third embodiments, fail-safe processing is carried out by controlling both intake-side and exhaust-side variable valve-lift mechanisms 8, 9. Optionally, fail-safe processing may be carried out through control of intake-side variable valve-lift mechanism 8 only.

Moreover, in the second and third embodiments, a final value of target throttle opening at the time of failure is determined to allow prevention of unstable vehicle behavior caused by a failure of variable valve-lift mechanisms 8, 9. Optionally, a final value may be determined to decrease engine output for informing a driver of occurrence of a failure of variable valve-lift mechanisms 8, 9.

Furthermore, variable valve-lift mechanisms 8, 9 may be a continuously variable control mechanism or a multistage variable control mechanism. It is noted that the former mechanism allows smooth control.

The entire contents of Japanese Patent Application 2001-274154 filed Sep. 10, 2001 and Japanese Patent Application 2000-315534 filed Oct. 16, 2000 are incorporated hereby by reference.

What is claimed is:

1. A fail-safe processing method for an internal combustion engine, the engine including at least an electronic-controlled intake device and a variable valve-lift mechanism for controlling a valve-lift amount, the method comprising:

carrying out a failure diagnosis for determining whether a failure of the electronic-controlled intake device occurs;

determining whether a mode of the failure of the electronic-controlled intake device is a vehicle accelerating mode when it is determined that the failure occurs;

carrying out a fail-safe processing when it is determined that the failure mode is the vehicle accelerating mode, wherein the fail-safe processing determines an optimal value of the valve-lift amount; and controlling the variable valve-lift mechanism in accordance with the optimal value of the valve-lift amount.

2. The fail-safe processing method as claimed in claim 1, wherein the optimal value of the valve-lift amount is determined to allow a gradual reduction in an intake-air amount to be supplied to a cylinder.

3. The fail-safe processing method as claimed in claim 1, further comprising:

determining whether a vehicle deceleration can be made by brake operation; and carrying out another fail-safe processing when it is determined that the vehicle deceleration cannot be made, wherein the another fail-safe processing carries out fuel cut.

4. The fail-safe processing method as claimed in claim 3, wherein fuel cut is carried out after a predetermined period of time of fuel supply.

5. A fail-safe processing method for an internal combustion engine, the engine including at least an electronic-controlled intake device and a variable valve-lift mechanism for controlling a valve-lift amount, the method comprising:

carrying out a failure diagnosis for determining whether a failure of the variable valve-lift mechanism occurs;

carrying out a fail-safe processing when it is determined that the failure of the variable valve-lift mechanism occurs, wherein the fail-safe processing determines an optimal value of an intake-air amount to be supplied to a cylinder; and controlling the electronic-controlled intake device in accordance with the optimal value of the intake-air amount.

6. The fail-safe processing method as claimed in claim 5, wherein the optimal value of the valve-lift amount is determined to allow a gradual reduction in an intake-air amount to be supplied to a cylinder.

7. The fail-safe processing method as claimed in claim 5, further comprising:
   determining whether a sensor for sensing the valve-lift amount is in working order;
   estimating the valve-lift amount for the variable valve-lift mechanism; and
   carrying out another fail-safe processing when it is determined that the failure of the variable valve-lift mechanism occurs and that the sensor fails to be in working order, wherein the another fail-safe processing determines the optimal value of the intake-air amount to be supplied to the cylinder in accordance with the estimated valve-lift amount.

8. A fail-safe processing method for an internal combustion engine, the engine including at least an electronic-controlled intake device and a variable valve-lift mechanism for controlling a valve-lift amount, the method comprising:
   carrying out a first failure diagnosis for determining whether a failure of the electronic-controlled intake device occurs;
   determining whether a mode of the failure of the electronic-controlled intake device is a vehicle accelerating mode when it is determined that the failure occurs;
   carrying out a first fail-safe processing when it is determined that the failure mode is the vehicle accelerating mode, wherein the first fail-safe processing determines an optimal value of the valve lift amount;
   controlling the variable valve-lift mechanism in accordance with the optimal value of the valve lift amount;
   carrying out a second failure diagnosis for determining whether a failure of the variable valve-lift mechanism occurs;
   carrying out a second fail-safe processing when it is determined that the failure of the variable valve-lift mechanism occurs, wherein the second fail-safe processing determines an optimal value of an intake-air amount to be supplied to a cylinder; and
   controlling the electronic-controlled intake device in accordance with the optimal value of the intake-air amount.

9. The fail-safe processing method as claimed in claim 8, further comprising:
   carrying out a third fail-safe processing when it is determined that the failure of the electronic-controlled intake device occurs, that the failure mode is the vehicle accelerating mode, and that the failure of the variable valve-lift mechanism occurs, wherein the third fail-safe processing adjusts a fuel-injection amount.

10. A fail-safe processing system for an internal combustion engine, comprising:
    an electronic-controlled intake device;
    a variable valve-lift mechanism that controls a valve-lift amount; and
    an electronic control unit (ECU) electrically connected to the electronic-controlled intake device and the variable valve-lift mechanism, wherein the ECU is constructed to:
       carry out a failure diagnosis for determining whether a failure of the electronic-controlled intake device occurs;
       determine whether a mode of the failure of the electronic-controlled intake device is a vehicle accelerating mode when it is determined that the failure occurs;
       carry out a fail-safe processing when it is determined that the failure mode is the vehicle accelerating mode, wherein the fail-safe processing determines an optimal value of the valve-lift amount; and
       control the variable valve-lift mechanism in accordance with the optimal value of the valve-lift amount.

11. The fail-safe processing system as claimed in claim 10, wherein the optimal value of the valve-lift amount is determined to allow a gradual reduction in an intake-air amount to be supplied to a cylinder.

12. The fail-safe processing system as claimed in claim 10, wherein the ECU is constructed to further:
    determine whether a vehicle deceleration can be made by brake operation; and
    carry out another fail-safe processing when it is determined that the vehicle deceleration cannot be made, wherein the another fail-safe processing carries out fuel cut.

13. The fail-safe processing system as claimed in claim 12, wherein fuel cut is carried out after a predetermined period of time of fuel supply.

14. A fail-safe processing system for an internal combustion engine, comprising:
    an electronic-controlled intake device;
    a variable valve-lift mechanism that controls a valve-lift amount; and
    an electronic control unit (ECU) electrically connected to the electronic-controlled intake device and the variable valve-lift mechanism, wherein the ECU is constructed to:
       carry out a failure diagnosis for determining whether a failure of the variable valve-lift mechanism occurs;
       carry out a fail-safe processing when it is determined that the failure of the variable valve-lift mechanism occurs, wherein the fail-safe processing determines an optimal value of an intake-air amount to be supplied to a cylinder; and
       control the electronic-controlled intake device in accordance with the optimal value of the intake-air amount.

15. The fail-safe processing system as claimed in claim 14, wherein the optimal value of the valve-lift amount is determined to allow a gradual reduction in an intake-air amount to be supplied to a cylinder.

16. The fail-safe processing system as claimed in claim 14, wherein the ECU is constructed to further:
    determine whether a sensor for sensing the valve-lift amount is in working order;
    estimate the valve-lift amount for the variable valve-lift mechanism; and
    carry out another fail-safe processing when it is determined that the failure of the variable valve-lift mechanism occurs and that the sensor fails to be in working order, wherein the another fail-safe processing determines the optimal value of the intake-air amount to be supplied to the cylinder in accordance with the estimated valve-lift amount.

17. A fail-safe processing system for an internal combustion engine, comprising:
    an electronic-controlled intake device;
    a variable valve-lift mechanism that controls a valve-lift amount; and an electronic control unit (ECU) electrically connected to the electronic-controlled intake device and the variable valve-lift mechanism, wherein the ECU is constructed to:
  carry out a first failure diagnosis for determining whether a failure of the electronic-controlled intake device occurs;
  determine whether a mode of the failure of the electronic-controlled intake device is a vehicle accelerating mode when it is determined that the failure occurs;
  carry out a first fail-safe processing when it is determined that the failure mode is the vehicle accelerating mode, wherein the first fail-safe processing determines an optimal value of the valve lift amount;
  control the variable valve-lift mechanism in accordance with the optimal value of the valve lift amount;
  carry out a second failure diagnosis for determining whether a failure of the variable valve-lift mechanism occurs;
  carry out a second fail-safe processing when it is determined that the failure of the variable valve-lift mechanism occurs, the second fail-safe processing determining an optimal value of an intake-air amount to be supplied to a cylinder; and
  control the electronic-controlled intake device in accordance with the optimal value of the intake-air amount.

18. The fail-safe processing system as claimed in claim 17, wherein the ECU is constructed to further:
  carry out a third fail-safe processing when it is determined that the failure of the electronic-controlled intake device occurs, that the failure mode is the vehicle accelerating mode, and that the failure of the variable valve-lift mechanism occurs, wherein the third fail-safe processing adjusts a fuel-injection amount.

* * * * *